Dec. 4, 1956 H. N. SHAW 2,772,626
SEMIAUTOMATIC FLOATING COVERS FOR FRY KETTLES
Filed Feb. 16, 1954 2 Sheets-Sheet 1

INVENTOR
Harold N. Shaw
BY
ATTORNEYS

Dec. 4, 1956  H. N. SHAW  2,772,626
SEMIAUTOMATIC FLOATING COVERS FOR FRY KETTLES
Filed Feb. 16, 1954  2 Sheets-Sheet 2

INVENTOR,
Harold N. Shaw
BY
ATTORNEYS

United States Patent Office 2,772,626
Patented Dec. 4, 1956

2,772,626

SEMIAUTOMATIC FLOATING COVERS FOR FRY KETTLES

Harold N. Shaw, Erie, Pa.

Application February 16, 1954, Serial No. 410,590

11 Claims. (Cl. 99—403)

This invention relates to improvements in semiautomatic floating covers for fry kettles.

In ordinary usage the fat in a fry kettle breaks down and has to be discarded after a few days time. This is particularly true in short order restaurants where the fry kettle has to be kept hot almost continuously. In such restaurants, however, the fat is used for actual cooking only a small percentage of the time and such a situation is, therefore, wasteful. Tests which have beeen made in connection with the development of the present invention indicate that most of the breakdown of the fat occurs at the surface where the hot fat comes in contact with the air.

In my pending application, Serial No. 186,734, filed September 26, 1950, a floating cover for fry kettles is disclosed, together with means rendering it relatively safe and convenient for a restaurant cook to move the cover into and out of fat-covering position.

It is a general object of the present invention to provide features of improvement over those disclosed in my prior application to thereby render the use of the cover more effective, and it is a further object to provide semiautomatic means for effectively keeping the fat surface covered when the fry kettle is not in use, with no objectionable interference with the activities of the cook.

A further object of the invention is to provide a construction wherein the cover is tilted before it is raised so that any fat which may cling to the bottom of the cover will run to the forward edge by gravity and drop back into the kettle with a minimum of splashing.

A further object of the invention is to provide latching means for holding the cover in inoperative position.

A more specific object of the invention is to provide cable or chain operated means for raising the cover and for controlling the lowering by gravity, together with guiding means which is so arranged as to prevent the front edge of the cover from dipping into or scooping up fat as the cover is being lowered. Thus, dangers which result from the splashing of hot fat are eliminated.

A further specific object of the invention is to provide a construction where there is a hanger for the fry kettle basket together with means for maintaining the cover out of the fat when the basket is not on the hanger, said cover being automatically lowered or lowering being permitted whenever the basket is on the hanger.

A still further specific object of the invention is to provide, in one form of the invention, means arranged to prevent release of the cover, regardless of the position of the basket or the temperature of the cover, as long as the source of heat for the kettle is on. This eliminates the possibility of inconvenience which might be caused by the cover falling prematurely during busy periods because of the basket being hung up momentarily.

A still further object is to provide means for semiautomatically controlling the cover in response to manipulations of the fry kettle basket.

A further object of the invention is to provide, in a device as above described, means for intercepting and segregating fat which drips off of the cover when the latter is in raised inoperative position.

With the above and other objects in view, the invention consists of the improved semiautomatic floating cover for fry kettles, and all of its parts and combinations, as set forth in the claims, and all equivalents thereof.

In the accompanying drawings illustrating preferred embodiments of the invention, in which the same reference numerals designate the same parts in all of the views.

Figure 1:
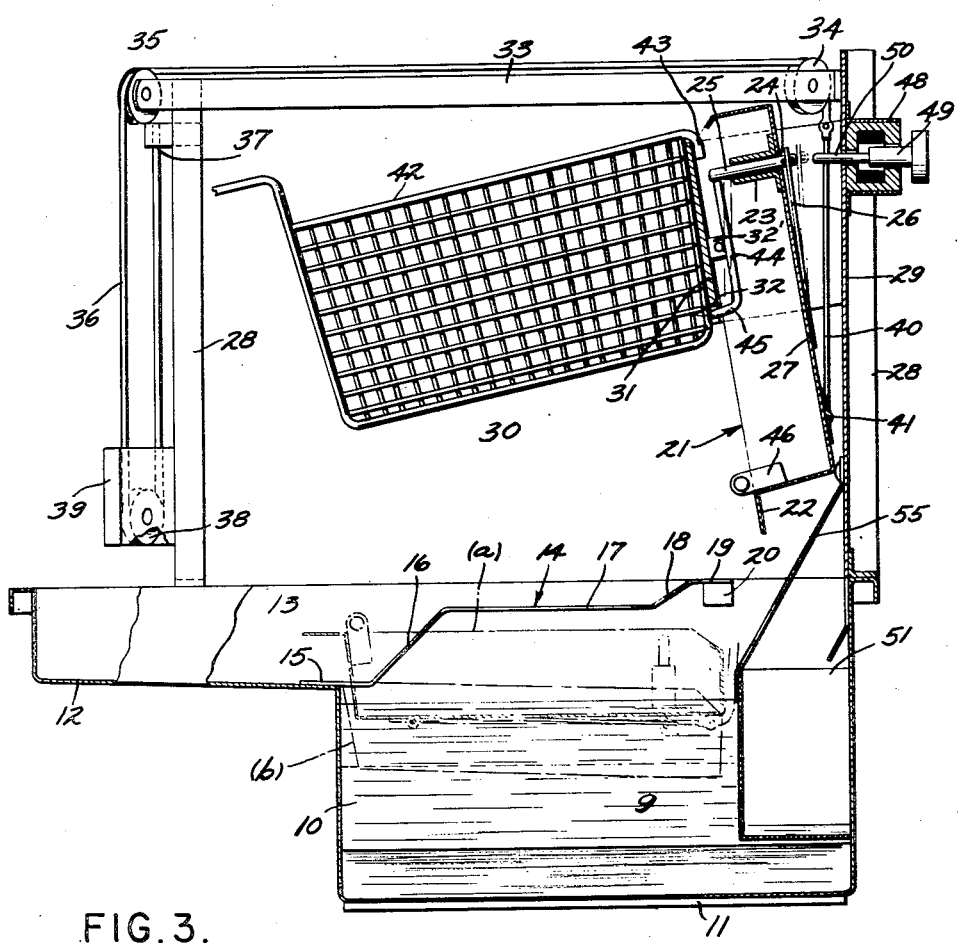
Fig. 1 is a side elevational view of a fry kettle embodying the improved features of the invention, parts being broken away and shown in vertical section, the dot and dash lines indicating two different positions of the cover on the fat.
Figure 2:
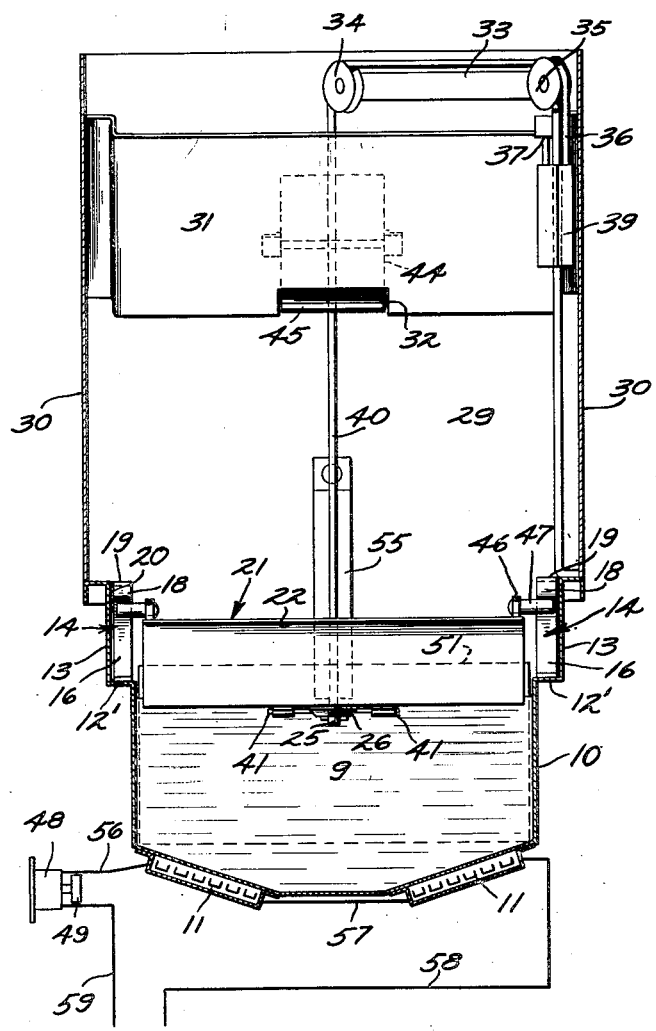
Fig. 2 is a view, principally in vertical section, looking from the left hand side of Fig. 1, the cover and cable operating mechanism therefor being shown in full.

Referring more particularly to Figs. 1 and 2 of the drawings, the numeral 10 designates a fry kettle of a type suitable for use for deep fat frying in restaurants. Suitable means such as the electric heating elements 11 may be provided for heating the fat. The fry kettle may also be provided with a suitable foam ledge such as that shown at 12 which projects forwardly from the upper portion of the kettle. The upper portions of the sides of the kettle are preferably bent outwardly to provide horizontal shoulders 12' and then upwardly as at 13 to provide spaced upper sidewall portions which are offset outwardly from the lower sidewall portions.

Suitably mounted to occupy the space above the shoulders 12 are launching rails 14. The front ends 15 of these rails are preferably horizontal and approximately in the plane of the shoulders 12. Rearwardly of the portions 15 the rails extend angularly upwardly as at 16, then rearwardly in a generally horizontal direction as at 17, and then upwardly for a short distance as at 18. The extreme inner ends 19 of the rails may be horizontal and suitably secured as at 20 to the sidewall portions 14.

A floating cover, designated generally by the numeral 21, for the fat 9 is generally pan-shaped as shown in Fig. 1 and preferably has a visor 22 positioned to project forwardly over the foam ledge 12, when the cover is in the dot and dash line position a, or to rest on the bottom of the foam ledge 12 when the cover is in a low fat position such as the dot and dash line position b of Fig. 1.

Projecting upwardly from the rear central portion of the floating cover 21 is a sleeve 23 which communicates with a hole 24 in the bottom of the cover, there being a latching pin 25 which is slidable in said sleeve. The lower end of the latching pin is suitably connected to the free end of a thermostrip 26 to be actuated thereby, the other end of said strip being secured to the underside of the bottom of the floating cover as at 27.

Projecting upwardly from the fry kettle are posts 28 which suitably support a back panel 29 and side panels 30. Suitably secured to the back panel near the upper portion thereof is a basket hanger bracket 31 which is generally U-shaped, its lower edge having a central cutout 32.

A horizontal bar 33, which extends obliquely of the device, and which is suitably secured to the back wall and to a front post rotatably supports spaced pulleys 34 and 35. A flexible cable 36 has one end anchored to one of the front posts 28, as at 37, and extends downwardly around a pulley 38 mounted in a vertically movable pulley block 39, the said pulley block also forming an operating handle. The cable 36 then extends upwardly and over the pulley 35, over the pulley 34, and downwardly to connect with the free end of a cable fastening hook 40. The free end of the hook are pivotally connected as at 41 to the bottom of the floating cover.

A fry basket 42 which is positionable in the fat 9 when frying is being done, is formed with downturned hooks 43 at the upper portion of its rear wall, which hooks are removably engageable with the upper edge of the basket hanger 31 when the basket is out of the fat and in the full line position of Fig. 1.

Pivoted to brackets 32' which project from the rear face of the basket hanger 31 is a latching lever 44 which lever has a forwardly flanged lower edge 45 positioned to move into the cutout 32 of the lower edge of the basket hanger 31 when the basket is not in place on the basket hanger. If the basket is hung on the hanger as in Fig. 1, then the rear wall of the basket pushes the flange 45 of the latching lever 44 inwardly as shown by full lines in Fig. 1.

Projecting upwardly from the sides of the floating cover at the forward end thereof are brackets 46 which support laterally projecting launching pins 47, the launching pins being positioned to ride on the launching rails 14.

Suitably connected to the upper portion of the back panel is a solenoid 48 having a plunger 49 with a projecting plunger pin 50. When the solenoid is energized, the pin is moved toward the inner end of the latching pin 25, to prevent movement of said pin 25 and thereby prevent lowering of the floating cover while the solenoid is energized.

Positioned in the rear of the fry kettle 10, in a location which is rearwardly of the floating cover when the latter is in position on the fat, is a removable fat dripping well 51 having an open top which is positioned to receive drippings from both the bottom and inside of the floating cover when the latter is in a raised vertical position as shown by full lines in Fig. 1.

Figure 3:
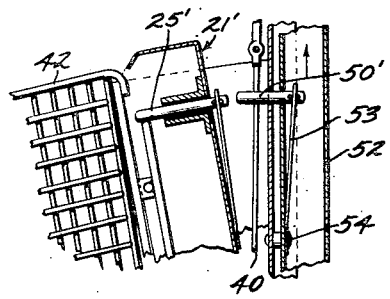
Fig. 3 is a fragmentary vertical sectional view of the basket hanger and cover latching mechanism showing a modification adapted for use when the fat is being heated by gas rather than electricity.

Fig. 3 illustrates an arrangement for preventing release of the floating cover when the fry kettle is heated by gas. In this figure all of the parts are indicated by the same reference numerals which are used in the principal form of the invention with prime marks applied. In this form of the invention the pin 50', which corresponds to the solenoid plunger pin 50 of Fig. 1, projects slidably through the back panel and into a flue 52 for exhaust gases from the gas burner. Within this flue is a thermostrip 53 with one end secured as at 54 and with its other end suitably connected to the plunger to cause movement of the latter. When the fat in the kettle is being heated by the gas burner, hot flue gases will be rising in the flue 52. The thermostrip 53 will respond to the temperature of these hot flue gases to move the pin 53' inwardly. Thus, as long as these hot flue gases are rising there can be no movement of the latching pin 25' and no release of the floating cover 21'.

*Operation*

When the fry kettle is not being used for cooking the cover may be floating on the fat at various levels to prevent oxidation. When the fat level is high the floating cover 21 may be in the dot and dash line position *a* of Fig. 1. When the fat level is low the cover 21 will be in the position shown by the dot and dash lines *b*. Regardless of this fat level, if it is desired to raise the floating cover 21 the pulley block or operating handle 39 is pulled downwardly to the position of Fig. 1. This exerts a pull on the cable 36 and cable hook 40 to first pull the rear edge of the floating cover onto the inclined guide rail 55. A pull on the cable also causes the launching pins 47 to engage the inclined portions 16 of the launching rails 14. As the pull on the cable continues, the pins 47 will ride onto and along the horizontal portions 17 of the launching rails. By this time the front of the cover has cleared the fat surface. Thereafter the pins 47 will move up on the rear portions 18 and 19 of the launching rails, and after they leave said portions 19, the front of the cover will ultimately engage the guide rail 55 and rise to the position shown by full lines in Fig. 1. In this position, gravity will cause the upper portion of the cover to fall forwardly against the front of the basket hanger 31, as illustrated. This is due to the fact that the cable hook 40 is secured to the lower end of the floating cover at the location 41.

As the cover moves to the full line position of Fig. 1, and assuming that the basket 42 is not in place on the hanger, the front end of the latching pin will ride up the rear face of the latching lever 4, which can rock on the pivot when the basket is not in place, and will then arrive at a position above the upper edge of the latching lever 44, as shown by the full lines in Fig. 1. At this time the floating cover is still hot so the thermostrip 26 is holding the latching pin 25 inwardly as shown by the full lines. When the cover cools off, then the thermostrip will cause the pin 25 to move to the dot and dash line position of Fig. 1. When in this position, however, the cover is still maintained in a raised position if the basket 42 is not in place, because the latching lever 44 is then in the dot and dash line position of Fig. 1. When the cover is in latched position it is, of course, prevented from dropping by gravity.

When the cover is in raised position the fat 9 is accessible for cooking and the basket 42, filled with food to be fried, may be immersed in the fat. As long as the electric heating elements 11 are in operation to keep the fat hot, the solenoid 48, which is connected in series with said elements by circuit wires 56, 57, 58 and 59, is kept in energized condition. This causes the plunger pin 50 to be moved toward the left to its full line position of Fig. 1 to prevent movement of the latching pin 25 off of the latching lever 44. Thus, even if the basket is hung up temporarily, the floating cover will not be lowered as long as the current for the heating elements 11 is on.

When there is an intention to stop cooking, then with the current turned off, the hanging of the basket in the position of Fig. 1 pushes inwardly on the flange 45 of the latching lever 44 to move said lever to the full line position of Fig. 1. Then, if the floating cover is cool, so that the thermostrip 26 has pulled the pin 25 to the dot and dash line position of Fig. 1, the forward end of the pin will be clear of the upper edge of the latching member and the cover will be permitted to drop.

When dropping, the cover slides down the guide strip 55 under the influence of gravity, causing the lower end of the cover to be moved forwardly until the launching pins 47 engage the portions 19 of the launching rails. These rails hold the front end of the cover out of the fat until the pins reach the forward ends of the horizontal parts 17 of the rails. Thereafter, the cover will slide down onto the surface of the fat. When the fat level is low, the visor 15 on the floating cover 21 will engage the foam ledge 12 before the pins reach the bottoms of the launching rail. Thus, there is no danger of the visor jamming against the front wall of the kettle. It is apparent that with this arrangement no dangerous splashing of fat will take place.

In cases where the fat is being heated by a gas burner, then the arrangement of Fig. 3 is utilized. Here, the thermostrip 53 in the flue 52 for the rising flue gases maintains the plunger pin 50' in an inwardly urged position as long as the flue is hot. Thus the floating cover is prevented from falling as long as the gas burner is turned on.

The fat dripping well 51 will catch any fat which runs out of the inside of the cover 21 or off of the bottom while the cover is hanging in the vertical position shown by full lines in Fig. 1. This fat is likely to become decomposed by contact with the air and should not be allowed to enter the main body of fat in the kettle because a small percentage of broken down fat can make the fat in the kettle unsuitable for cooking. The well may also intercept some foam whenever the fat foams up as a result of wet food. This foam is also likely to be broken down due to contact with air and should also be discarded.

Various other changes and modifications may be made without departing from the spirit of the invention and all of such changes are contemplated, as may come within the scope of the claims.

What I claim is:

1. In combination, a fry kettle having a fat receiving portion, a cover of a size to fit within said fat receiving portion, a food basket of a size to fit within said kettle, guiding means for directing movement of said cover into and out of fat covering position, a basket hanger above said kettle, a latch adjacent said hanger positioned to releasably maintain said cover in raised position means for elevating said cover to a position where it is engaged by said latch, said latch having a movable release portion which is positioned to be engaged by said basket when the latter is on the hanger to permit release of said cover.

2. A fry kettle having a fat receiving portion provided with a wall portion, a cover of a size to fit within said fat receiving portion, inclined guiding means on said wall portion for directing movement of said cover into and out of horizontal fat covering position, and means including an elongated flexible member connected to said cover for controlling movement of said cover on said guiding means into and out of fat covering position, said flexible member and its connection with the cover being located to cause said cover to assume an upright position as it is being moved in engagement with said guiding means out of the fat receiving portion.

3. A fry kettle having a fat receiving portion provided with a wall portion, a cover of a size to fit within said fat receiving portion, inclined guiding means on said wall portion for directing movement of said cover into and out of horizontal fat covering position, means including an elongated flexible member connected to said cover for controlling movement of said cover on said guiding means into and out of fat covering position, said flexible member and its connection with the cover being located to cause said cover to assume an upright position as it is being moved in engagement with said guiding means out of the fat receiving portion, means for exerting a pull on said flexible member to move said cover out of fat covering position, and latching means for releasably holding said cover in said position.

4. A fry kettle having a fat receiving portion, a cover of a size to fit within said fat receiving portion, spaced launching means on said kettle cooperable with said cover for directing movement of the cover into and out of a position to float on said fat, and means including an elongated flexible member connected to said cover for controlling said movement of said cover on said spaced launching means said flexible member and its connection with the cover being so located and said launching means being so shaped as to cause the cover to move in a generally lateral direction and then upwardly to a generally upright position.

5. A fry kettle having a fat receiving portion provided with a wall portion, a cover of a size to fit within said fat receiving portion, inclined guiding means on said wall portion for directing movement of said cover into and out of horizontal fat covering position, an elongated flexible member connected to said cover, and means for exerting a pull on said flexible member to move the cover out of fat covering position, said flexible member being so connected to the cover as to cause tilting of the cover prior to movement out of fat covering position.

6. In combination, a fry kettle having a fat receiving portion, a cover of a size to fit within said fat receiving portion, a food basket of a size to fit within said kettle, guiding means for directing movement of said cover into and out of fat covering position, an elongated flexible member connected to said cover, means for exerting a pull on said flexible member to move the cover out of fat covering position, a basket hanger supported adjacent said kettle, latching means adjacent said basket hanger for releasably holding said cover in said position out of the fat, said latching means being positioned for engagement by said basket to normally release said cover when said basket is on the hanger, and thermostatic means responsive to the temperature of the cover for preventing said release when said cover is above a predetermined temperature.

7. In combination, a fry kettle having a fat receiving portion, a cover of a size to fit within said fat receiving portion, a food basket of a size to fit within said kettle, a hanger for said basket supported adjacent said kettle, means for moving said cover out of fat covering position, cooperating latching means on said cover and hanger for releasably maintaining said cover out of the fat, an electric heater for said kettle, a circuit for said heater, and electrically operated means in said circuit coacting with said latching means for preventing release of said cover as long as said heater is in operation, said latching means being responsive to engagement of said basket with the hanger to release said cover when said heater is not in operation.

8. In combination a fry kettle having a fat receiving portion, a cover of a size to fit within said fat receiving portion, a food basket of a size to fit within said kettle, guiding means for directing movement of said cover into and out of fat covering position, means adjacent said cover guiding means for removably supporting said basket, operating means for said cover, means for releasably supporting said cover in a position out of the fat receiving portion, and means responsive to removal of said food basket from its supporting means for initiating movement of the cover.

9. In combination a fry kettle having a fat receiving portion, a cover of a size to fit within said fat receiving portion, a food basket of a size to fit within said kettle, guiding means for directing movement of said cover into and out of fat covering position, means adjacent said cover guiding means for removably supporting said basket, operating means for said cover including an elongated flexible member, means for releasably supporting said cover in a position out of the fat receiving portion, and means responsive to removal of said food basket from its supporting means for initiating movement of the cover.

10. In combination a fry kettle having a fat receiving portion, a cover of a size to fit within said fat receiving portion, a food basket of a size to fit within said kettle, guiding means extending above the fat receiving portion of the kettle for directing movement of said cover into and out of fat covering position, means positioned at an elevation above the basket and adjacent said cover guiding means for removably supporting said basket in inoperative position, operating means for said cover, means for releasably supporting said cover in an elevated position out of the fat receiving portion, and means engaged by the basket when the latter is in inoperative position for initiating lowering movement of the cover on its guiding means into position over the fat receiving portion.

11. In combination a fry kettle having a fat receiving portion, a cover of a size to fit within said fat receiving portion, a food basket of a size to fit within said kettle, an external support for said basket when it is out of the kettle, means for releasably holding said cover in a raised inoperative position and including a pivotally mounted release lever, guiding means for directing movement of said cover by gravity from said raised position into fat covering position, said basket being manually movable from a position within said fat receiving portion to a position on said external support, said release lever being positioned to be actuated by said basket during said manual movement of the basket to cause release of said cover holding means.

References Cited in the file of this patent

UNITED STATES PATENTS

| | | |
|---|---|---|
| 251,245 | King | Dec. 20, 1881 |
| 1,575,033 | Bown | Mar. 2, 1926 |
| 1,576,321 | Gasser | Mar. 9, 1926 |
| 1,963,294 | Davis | June 19, 1934 |
| 2,142,469 | Williamson et al. | Jan. 3, 1939 |
| 2,223,023 | Weilemann | Nov. 26, 1941 |
| 2,424,715 | Shreve | July 29, 1947 |